Jan. 8, 1957  W. KILLIUS  2,776,587
AUTOMOBILE BUMPER, GRILLE AND BODY BENDING TOOL
Filed July 12, 1954
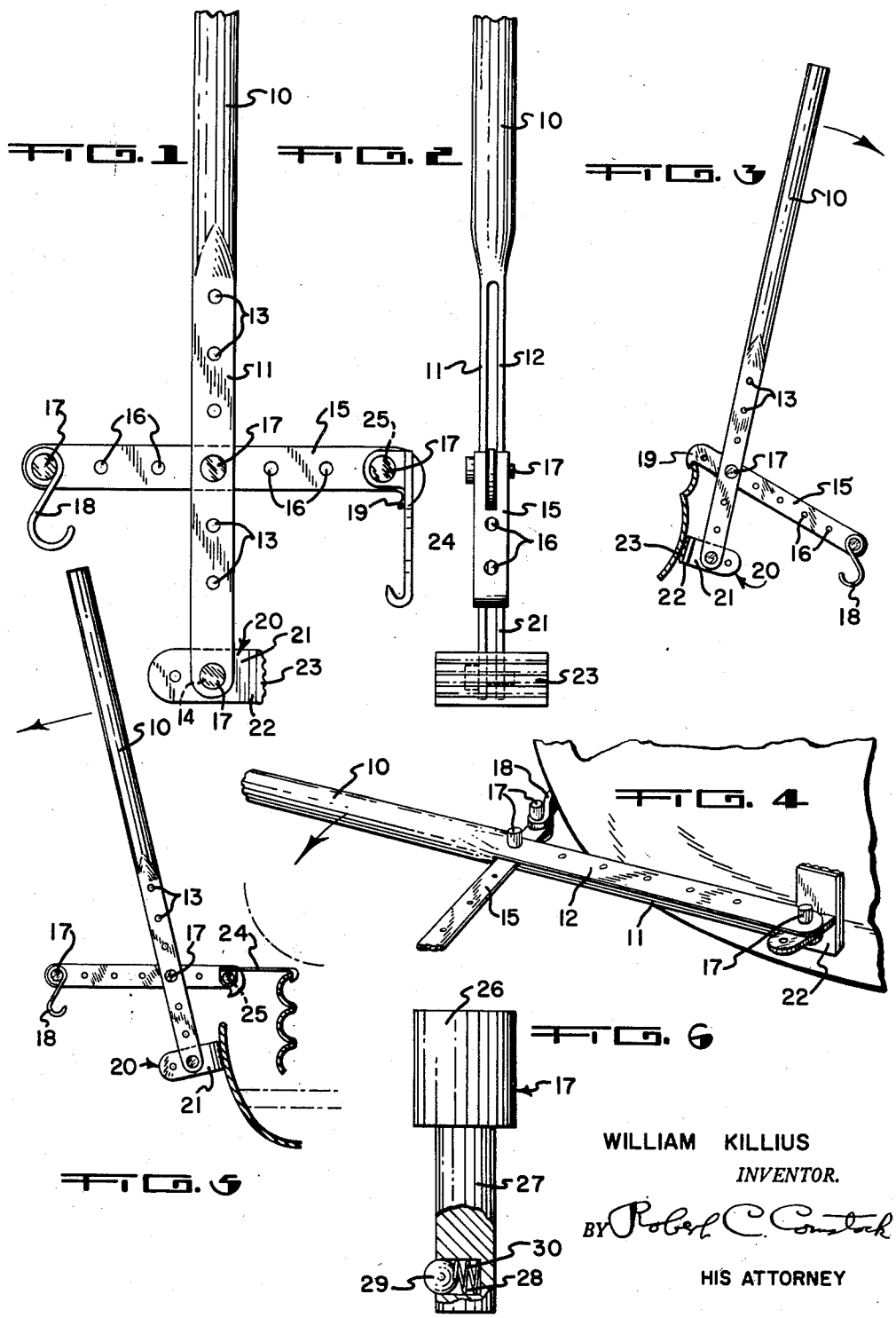
WILLIAM KILLIUS
INVENTOR.
BY Robert C. Comstock
HIS ATTORNEY

United States Patent Office 2,776,587
Patented Jan. 8, 1957

2,776,587
AUTOMOBILE BUMPER, GRILLE, AND BODY BENDING TOOL

William Killius, Altadena, Calif.

Application July 12, 1954, Serial No. 442,528

4 Claims. (Cl. 81—15)

This invention relates to a tool for use in bending or straightening the bumper, grille, body and other exterior portions of an automobile in order to restore their original contours and appearance.

It is an object of my invention to provide a single tool which is capable of performing practically any bending or straightening operation on the exterior of any make or model of automobile.

It is a further object of my invention to provide such a tool which will perform such work in a minimum amount of time and with a minimum amount of effort by utilizing leverage principles to perform the bending or straightening operation.

Another object of my invention is to provide such a tool which is so adjustable and versatile that no other tools are required for straightening operations. It is a related object of my invention to make the adjustments of my tool easily and quickly accomplished in order to save time and effort on the part of the user and simplify the operation of my tool.

It is also among the objects of my invention to provide such a tool which is so simple to use that a relatively inexperienced or unskilled person, such as a used car or parking lot owner or employee, can use it to perform repair and straightening operations which would otherwise be performed in an automobile repair shop. In the case of a used car, such work enhances the value of the car. In the case of a car which is damaged in a parking lot, such work saves arguments with customers and costly repair bills.

A further object of my invention is to provide a tool which can be manufactured and sold at a relatively low price, so that the cost of the tool itself is far less than the saving in time or repair bills.

While my tool is particularly intended for use in the repair of automobiles, it may be used in the repair of other vehicles and in the repair, straightening or bending of any objects which are formed of sheet metal.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings, Fig. 1 is a side elevational view of my tool, with the handle broken away;

Fig. 2 is a front plan view of the same;

Fig. 3 is a side elevational view of my tool in use, straightening the top of a bumper;

Fig. 4 is a perspective view of my tool in use, straightening the edge of a fender;

Fig. 5 is a side elevational view of my tool in use, straightening a grille;

Fig. 6 is an enlarged side elevational view, partly in section, of the pins used to hold the adjustable parts of my tool.

A preferred embodiment which has been selected to illustrate my invention comprises an elongated handle 10, which is preferably formed of round metal tubing, which serves as a handle and operating portion of my tool. Integral with handle 10 at one end thereof are a pair of parallel elongated members 11 and 12, which are provided with a plurality of pairs of spaced aligned holes 13, with an additional pair of holes 14 being provided adjacent their ends.

An elongated cross bar 15 is preferably formed of metal and is provided with a plurality of spaced holes 16. A pin 17 is removably mounted through one of the holes 16 and one of the pairs of holes 13 to mount cross bar 15 pivotally with respect to elongated members 11 and 12.

A flat hook which is of approximately the same width as handle 10 is removably and pivotally attached to the end of cross bar 15 by a pin 17 which extends through one of the holes 16 and through a mounting bracket which is integral with hook 18. A small catch 19 is provided at the opposite end of cross bar 15 and is formed integrally therewith.

A lever base 20 is removably and pivotally mounted in holes 14 at the end of elongated members 11 and 12. Lever base 20 is provided with a shank 21 with the shank 21 having a pair of holes through either of which a pin 17 extends. Lever base 20 has a substantially rectangular gripping portion 22 on which is mounted a gripping pad 23 which is preferably formed of corrugated rubber, leather or some other material which will grip but not mar a metal surface.

A grill catch 24 is removably and pivotally mounted in one of the holes 16 in cross bar 15 adjacent catch 19. Grille catch 24 is provided with a hole 25, through which a pin 17 extends. Grille catch 24 is provided with a hook shaped end portion which is adapted to catch and hold the automobile grille.

Grille catch 24 is actually substantially smaller in its dimensions than hook 18 and is enlarged in the drawings for purposes of illustration. Grille catch 24 is preferably and purposely made of such small size that it will fit between the openings of an automobile grille.

All the pins 17 which are used to attach the parts of my tool to each other are constructed in the manner shown in Fig. 6 of the drawings. Each of the pins 17 is provided with an enlarged head 26, a shank 27 and an opening 28 in the side of shank 27. A ball 29 is held partially within opening 28 and partially projecting therefrom beyond the circumference of shank 27. Outward pressure is exerted on ball 29 by a coil spring 30, which is disposed behind ball 29 within opening 28. Ball 29 may be moved within opening 28 by pressure which counteracts that of coil spring 30. Ball 29 normally projects to prevent displacement of pins 17 and is pushed inwardly to align with the circumference of shank 27 when a pin is inserted or removed.

This construction is only illustrative of a quick and easy type of holding device which permits my tool to be rapidly adjusted for any job. Other holding devices having the same advantages may also be used for this purpose.

In use, lever base 20 is customarily attached through holes 14 adjacent the end of handle 10, although it may be moved to any of holes 13 in order to provide various types of leverage action. If a bumper is to be straightened, as shown in Fig. 3 of the drawing, cross bar 15 is attached to the operating portion of handle 10 through whatever combination of holes 13 and 16 will give the desired direction of force. Changes in this connection are easily made by removal of pin 17 and adjustment of the positioning of cross bar 15 with respect to parallel members 11 and 12. Lever base 20 bears against a portion of the bumper while catch 19 at the end of cross bar 15 catches the top of the bumper. The pin 17 which joins cross bar 15 to parallel members 11 and 12 acts as a fulcrum for a lever action when the top of handle 10 is moved to the right to exert force tending to move the top of the bumper to the right.

If a fender or body portion is to be straightened, as shown in Fig. 4, lever base 20 bears against the side of the fender, with gripping pad 23 preventing the damage to the fender. The pin 17 which holds cross bar 15 extends through the uppermost of holes 13 and the hole 16 adjacent hook 18. Hook 18 catches the back of the fender edge. As handle 10 is moved away from the automobile, outwardly directed force is exerted on the edge of the fender.

In the case of a grille, grille catch 24 is attached to the end of cross bar 15. Lever base 20 bears against the bumper, while handle 10 is moved outwardly to exert outwardly directed pressure on the grille.

The uses shown and described are only illustrative of the use of my device, since it would be impossible to show and describe all of the uses to which my tool may be put. With its rapid and complete adjustability, it is so versatile that it can perform on any automobile or vehicle any straightening operation which can be accomplished by leverage action. It can be adjusted to fit any desired angle and any contour or construction of automobile body, bumper or grille and can be used as well for other vehicles and other straightening operations.

I claim:

1. An automobile bumper and body bending tool comprising an elongated handle adapted to be manually gripped adjacent one end thereof, an operating portion disposed adjacent the opposite end of said handle, said operating portion being bifurcated to provide a pair of substantially flat parallel elongated members, a row of spaced aligned openings extending transversely through both of said elongated members, said row extending longitudinally therealong, a substantially flat cross bar extending between said elongated members, said cross bar having a plurality of spaced openings extending transversely therethrough along substantially its entire length, said openings corresponding in size to the openings in said elongated members, a pin removably extending through any one of the openings in said cross bar and any pair of the openings in said elongated members to adjustably mount said cross bar with respect to said handle, said cross bar having hook means adjacent at least one end thereof, and a lever base pivotally attached adjacent the end of said operating portion.

2. The subject matter of claim 1, said lever base having a substantially flat shank extending tranversely between said elongated members, said shank having a pair of openings extending therethrough, said openings corresponding in size to the openings in said elongated members, and a pin removably extending through one of the openings in said shank and any one pair of openings in said elongated members to mount said lever base pivotally and adjustably with respect to said handle.

3. The subject matter of claim 1, said lever base having a substantially flat shank extending transversely between said elongated members, said shank having at least one opening extending therethrough, a fastening member removably extending through the opening in said shank and any pair of openings in said elongated member, said lever base having a gripping portion extending at substantially a right angle to said shank, and a frictional gripping pad mounted on said gripping portion.

4. The subject matter of claim 1, said pin having a head which is larger than the openings in said elongated members and a shank which is smaller than said openings, said shank having a hole in the side thereof, a ball mounted within said hole, a spring mounted within said hole behind said ball, said spring normally urging said ball so that a portion thereof normally extends beyond the circumference of said shank, said ball adapted to be completely moved into said hole against the pressure of said spring to permit said shank to pass through said openings.

References Cited in the file of this patent

UNITED STATES PATENTS

| | | |
|---|---|---|
| 1,620,920 | Porter | Mar. 15, 1927 |
| 1,737,084 | Hilstad | Nov. 26, 1929 |
| 1,814,435 | De Laney | July 14, 1931 |
| 1,975,773 | Davis | Oct. 9, 1934 |
| 2,191,720 | Meinhardt | Feb. 27, 1940 |
| 2,597,103 | Johnson et al. | Mar. 20, 1952 |
| 2,654,279 | Tomarin | Oct. 6, 1953 |